Jan. 31, 1956
W. E. ENGELHARD
2,733,387
SWITCH CONTROL DEVICE
Filed Jan. 17, 1951
2 Sheets-Sheet 1
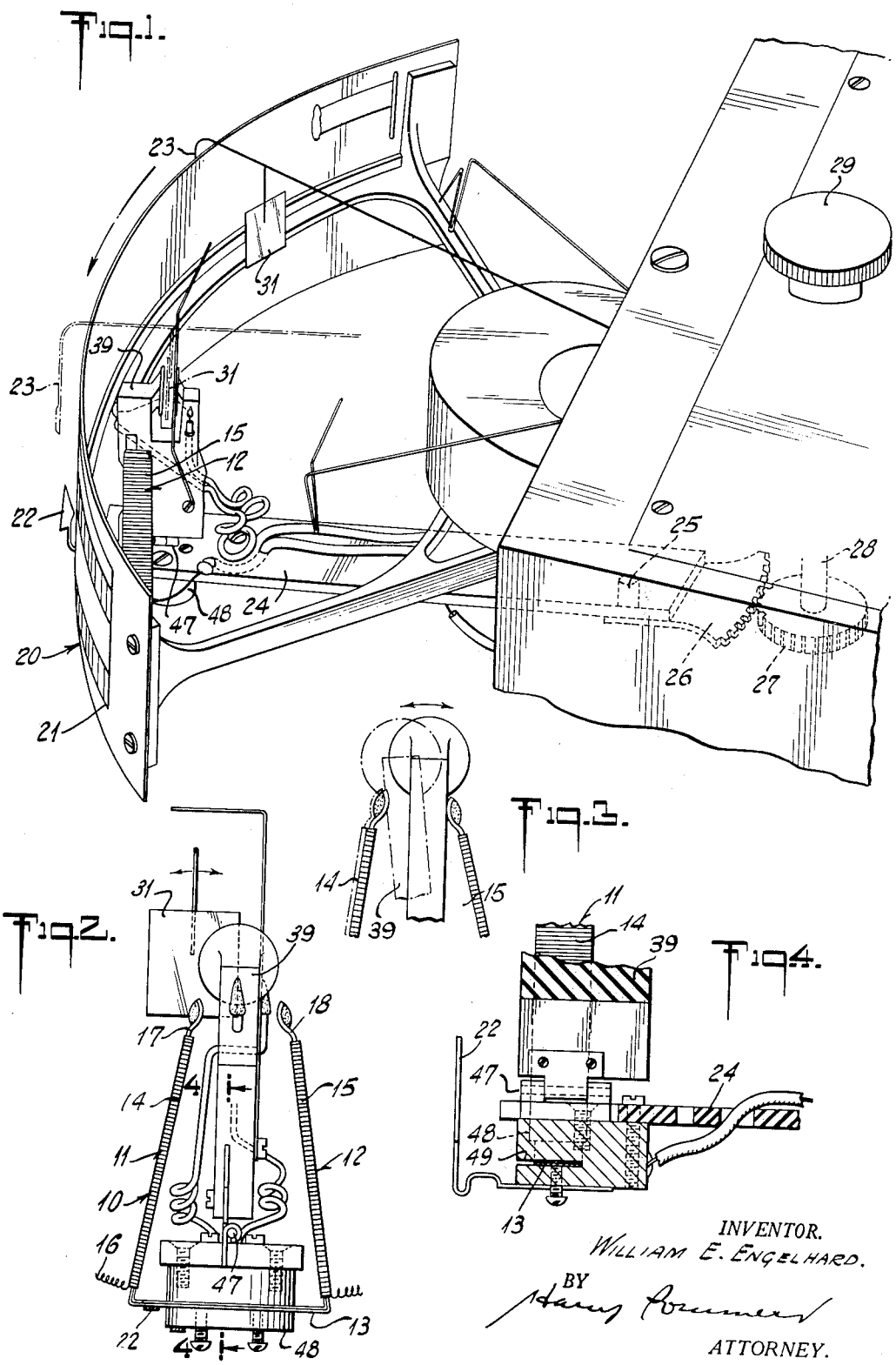
INVENTOR.
WILLIAM E. ENGELHARD.
BY
Harry Sommers
ATTORNEY.

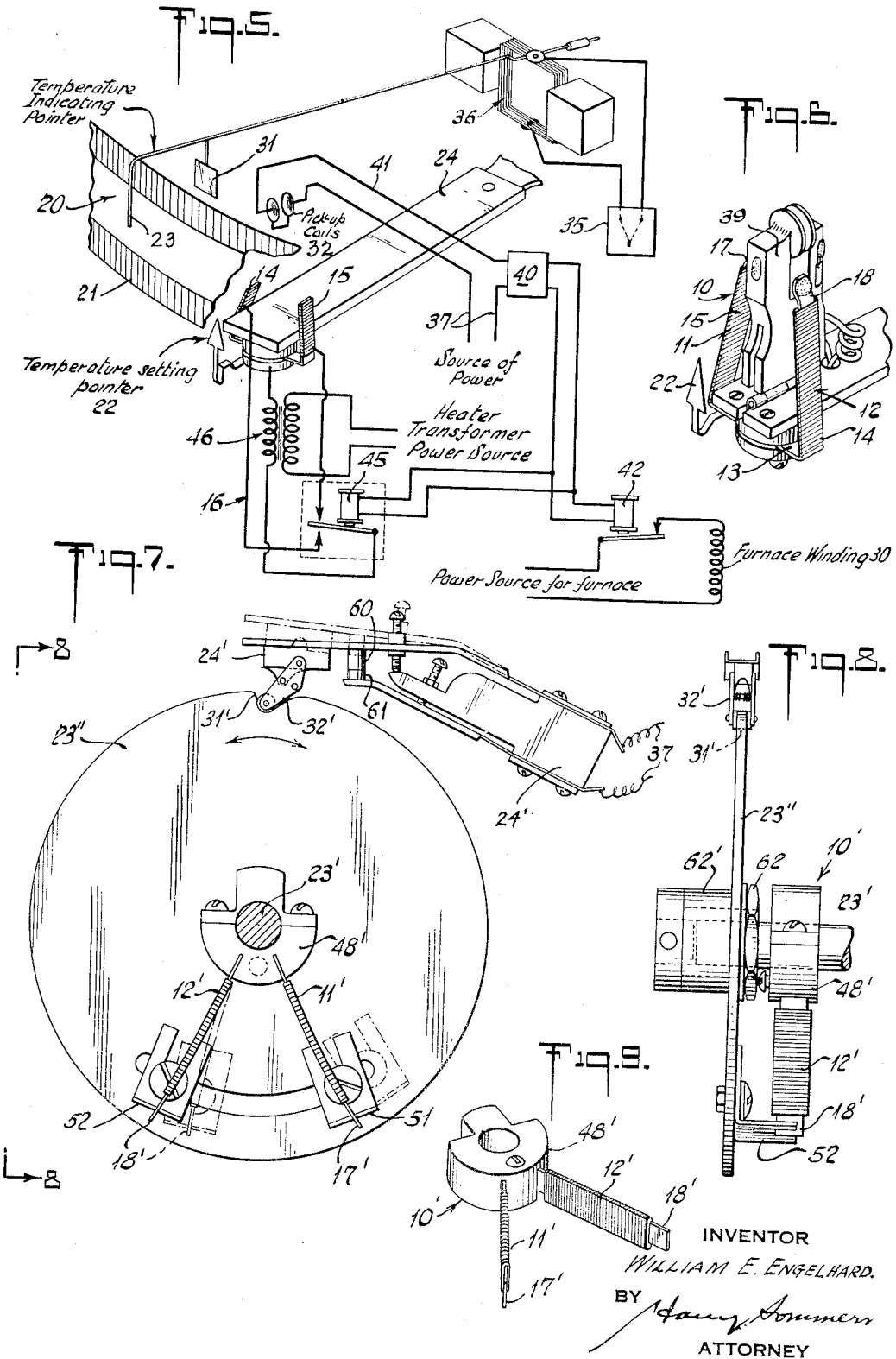

United States Patent Office 2,733,387
Patented Jan. 31, 1956

2,733,387

SWITCH CONTROL DEVICE

William E. Engelhard, North Arlington, N. J.

Application January 17, 1951, Serial No. 206,366

2 Claims. (Cl. 317—132)

This invention relates to a device for use in connection with an indicator for a mechanism to be controlled. It is adapted for use, for example, as illustrated in the accompanying drawings, in connection with a pyrometer or other energy-measuring or indicating device. Such control devices are customarily provided with a pointer which may be set at the desired or maximum condition of energy, as, for example, to indicate a selected or desired condition, for example, of temperature. Such devices have also been provided with a pointer to indicate actual, room, or operating conditions. The pointers of such control devices have been provided with complementary switch parts, the arrangement being such that when the pointers registered, indicative of attainment of the desired condition, the circuit or other energy source would be opened or closed as desired. Graphs calibrated to such control devices have recorded sine wave curves like the conventional A. C. sine wave, indicating an abrupt on-and-off switch effect, with appreciable intervals. The source of energy would go off, for example, when the pointers were in registry and would stay off until the pointers moved completely apart to a sufficient extent to open the switch. Usually this required a fairly substantial range of movement so that the on-off switch operation would not occur for minor condition changes, for example, of temperature of less than one degree in value.

The present invention is designed to provide a switch control device which will serve to smooth out the on-off operation, and enable the same to occur within a much lesser range of difference of operating conditions. The switch control device of the invention further anticipates the movement of the pointer which indicates the variable, actual, or operating conditions toward the other or fixed pointer, so as to accelerate the registry and dissociation of the pointer switch parts responsive to changes at an advance in time. The switch control device is provided with neutralizing or stabilizing features. It is automatic and positive in operation and its components cooperate to attain the desired objectives above noted and described below.

In the drawings:

Fig. 1 is a fragmentary perspective view of a device embodying one form of the invention, Fig. 2 is a vertical elevational view of the switch control device of the invention, showing the switch parts in registered position, Fig. 3 is a fragmentary elevational view of the device, showing, in full lines, a neutral or normal position, and, in dotted lines, a position of deviation therefrom, illustrating the oscillating effect attained pursuant to the invention, Fig. 4 is a fragmentary elevational view taken on line 4—4 of Fig. 2, Fig. 5 is a fragmentary, partly sectional, partly schematic view of a device embodying the invention, Fig. 6 is a perspective view of the form of switch control device shown in Fig. 2, Fig. 7 is an elevational view of another form thereof, Fig. 8 is a side elevational view taken on line 8—8 of Fig. 7, and Fig. 9 is a perspective view of the switch control device shown in Figs. 7 and 8.

A switch control device embodying the invention is designated in Fig. 6 by the reference character 10. Another form, shown in Fig. 9, is indicated by the reference character 10'. The form of invention shown in Fig. 6 comprises a pair of arms 11, 12, which may be parts of a U-shaped plate, for example, having a connector bar portion 13. The arms 11, 12 are preferably formed of bimetallic material so that, when heated, they will bow and direct their free ends 17, 18 toward each other. The arms are further provided with heater coils 14, 15, means 16 (Fig. 5) being provided to selectively heat one of said coils to selectively direct the arm on which said coil is positioned toward the other arm. The device is adapted to be used in connection with an energy indicator 20 for a source of energy to be controlled; said indicator may be a scale 21 suitably calibrated and provided with a pointer 22 which may be fixed or pre-set by the user at the selected or desired condition to be attained. Another pointer, 23 (Fig. 1), is provided which is movable to mark the actual or operating condition. The pointer 22 may be carried by a beam 24 pivoted as at 25 (Fig. 1) in the housing not shown) for the indicator 20. Said beam may be further provided with means, such as a segment 26, engaging a pinion 27 fixed to a shaft 28 having a control knob 29, whereby the operator may "set" the pointer 22 to mark the desired condition. The mechanism or circuit 30 to be controlled may, as shown in Fig. 5, be a furnace power source or the like. Complementary switch parts 31, 32 are secured to the pointers 23, 24. The pointer 23 is actuated responsive to the variable condition at the mechanism 30, as, for example, by connecting said pointer with electromagnetic coils 36 energized by the thermo-couple 35, which, in practise, might be in or connected to the mechanism 30 so as to reflect the condition of the latter. The specific source of movement of pointer 23 just mentioned is stated merely by way of example. Said pointer may be a thermometer mercury column or other mechanism reflecting or responsive to operating conditions.

The switch (comprising parts 31, 32, carried by pointers 23, 22) controls the circuit for the relay 42, which in turn controls circuit 30 for the mechanism to be controlled, so that when said switch parts 31, 32 are in registered or operating position (Fig. 2), the mechanism 30 will be disconnected or otherwise controlled.

In the specific form shown in Fig. 5, by way of example only, this switch effect is attained by utilization of inductance coils as the switch part 32. These inductance coils are energized from a suitable source current 37 flowing therefrom through a valve or other circuit control device 40 (as indicated at 41) to control the relay 42 which controls the circuit 30. It will be apparent that in the form of switch given by way of example above, the relay 42 will be closed to complete the circuit to the mechanism 30 only as long as the switch consisting of parts 31, 32 is inoperative, permitting current to flow from the source 37 through the mechanism above described and to the relay 42. The valve 40 may be a change-sensitive device such as, for example, a vacuum tube, a photo-electric cell, etc., responsive to current changes. As long as there is no obstacle in the field between the coils of the switch part 32, the valve 40 will permit sufficient current to pass therethrough for the actuation of the relay 42. If, however, the switch part 31 is projected between the coils of the part 32, the inductance of the coils will be varied, correspondingly varying the current input to the valve 40 (and output therefrom), causing the relay 42 to open and break the circuit 30 to be controlled.

The specific switch effect described may be reversed by suitable reversal of the parts so that the relay 42 would normally be open and would close only upon registry of the switch parts, within the spirit and scope of the invention. Such reversal would require a simple change of parts which will be apparent, from the present disclosure, to those skilled in the art.

As long as the switch parts 31, 32 are out of registry, current will flow uninterruptedly from the valve 40 and to the relay 45 to actuate the same to connect the heater coil 15, for example, of arm 12 to heater energy source 46. Upon registry of the switch parts 31, 32, the relay 45 will be opened to connect the heater source 46 with the other heater coil—14, of the other arm, 11. Thus, as the pointer 23 moves toward pointer 22, indicating an approach to the desired condition, relays 45 and 42 being closed, the arm 12 will be bowed toward pointer 23 to anticipate the arrival of pointer 23. When pointer 23 has moved sufficiently to project switch part 31 between the pick-up coils of switch part 32 (Fig. 2), relay 45 will be opened, energizing heater 14 for the arm 11, causing said arm to bow away from pointer 23, on toward arm 12, urging switch part 32 away from part 31.

The switch part 32, as shown in Figs. 2 and 6, is carried by a post 39 which is pivoted as at 47 to beam 24. In the form shown in Figs. 2 and 6, the U-shaped plate 13 including arms 11 and 12 is anchored to a metallic base plate 48, which is preferably slotted as at 49 (Fig. 4) to receive the connector bar portion 13, fixed thereto in any desired or convenient manner.

It has been found, in practice, that the construction just described, namely, the provision of the solid metallic base plate 48 through which bar 13 passes, apparently serves as a reservoir or storage element to enhance the operating effect of the switch control device of the invention, possibly serving as a mild conditioner or pre-heater for each arm from the other. It has been found to be highly desirable to form the switch control device with the metallic base plate 48, although that is not essential to its operation.

In Figs. 7 and 8, another form of switch control device, 10', is shown embodying the invention. In this form, the bimetallic arms 11', 12' are fixed at one end to base 48'. The free ends 17', 18' of said arms are positioned in slotted clips 51, 52 or the like fixed to disc 23". The parts just referred to with the use of single prime marks broadly correspond to those designated in Fig. 6 by similar principal reference characters. The part 24' might be the setting device rotatable circumferentially relative to the shaft 23' so as to fix or set part 24' to the desired condition, thus corresponding generally for the purpose to the part 24 in Fig. 5. The shaft 23' might be automatically rotated responsive to actual or operating conditions, just as was the part 23 in Fig. 5. Disc 23" has a switch part 31' (a recess) complementary to part 32', carried by member 24', so that on registry of parts 31', 32', contacts 60, 61 will close, to actuate any suitable mechanism to open the circuit to relay 42, for example, or to perform some other control function. The disc 23" is loosely mounted on shaft 23', between coupling parts 62, 62'. Principal rotation of the disc 23" is attained responsive to rotation of shaft 23' on fluctuation of operating conditions, the disc being keyed to arms 11, 12, as at 51, 52, said arms in turn being keyed, as by block 48' to shaft 23'. The arms 11', 12' have heater coils corresponding to coils 14, 15 of arms 11, 12 of Fig. 6, connected to a means such as 46.

The arms 11', 12' also operate independently of rotation of shaft 23" to move disc 23" in a fashion and for a purpose corresponding to the movement of block 39 carrying switch part 32 by arms 11, 12.

The invention has been described for control of a mechanism actuated by an electrical source of energy. It is equally applicable to any other source of energy operating on the principle of flow or motion of electrons or other parts of matter.

Having thus described my invention, what I claim as new and desire to secure by Letters Patent is:

1. A switch for an electrical mechanism comprising a first element adapted to reciprocate in a given plane responsive to operating conditions, an electrical switch part secured to said first element, a second element adapted to be set at a point in the path of said plane of reciprocation of said first element to indicate a desired setting, a post pivotally connected to said second element and having an electric switch part secured thereto for effecting a switching action on registry of the switch part of the first element therewith, a pair of bi-metallic elements mounted on the second element to which the post is pivoted and straddling opposite sides of the post in line with the plane of pivotal movement thereof, heating means for said bi-metallic elements and means to selectively actuate said heating means so that the heating means for the bi-metallic element on the side of the post remote from the first element to pivot the post toward the first element will be actuated prior to registry thereof with the second element, and the heating means for the other bi-metallic element to pivot said post away from the first element will be actuated on registry of the electric switch part of the first element with the electric switch part carried by the post, whereby the directions of movement of said first element will be anticipated to tilt the post toward the first element while the first element is moving in the direction of the second element and to move the second element away from the first element after said switch parts have been so registered.

2. In a switch for an electrical mechanism as set forth in claim 1, a slotted metallic base plate on said second element to which the ends of said bi-metallic elements are secured.

References Cited in the file of this patent

UNITED STATES PATENTS

| 1,867,380 | Runyon | July 12, 1932 |
| 1,928,907 | Noble | Oct. 3, 1933 |
| 2,140,473 | Grant | Dec. 13, 1938 |
| 2,208,760 | Hartig | July 23, 1940 |
| 2,234,895 | Cerveny | Mar. 11, 1941 |
| 2,462,566 | Smith | Feb. 22, 1949 |
| 2,514,918 | Wannamaker | July 11, 1950 |
| 2,530,157 | Eckman | Nov. 14, 1950 |